United States Patent
Denicola, Jr.

(10) Patent No.: US 12,215,209 B2
(45) Date of Patent: Feb. 4, 2025

(54) SOLVENT BLENDS FOR OLEFIN SHRINK FILM SEAMING, SHRINK LABELS FORMED WITH SAID SOLVENT BLENDS AND METHODS OF PROVIDING SEAMS WITH SAID SOLVENT BLENDS

(71) Applicant: TAGHLEEF INDUSTRIES INC., Newark, DE (US)

(72) Inventor: Anthony J. Denicola, Jr., Old Lyme, CT (US)

(73) Assignee: TAGHLEEF INDUSTRIES INC., Newark, DE (US)

( * ) Notice: Subject to any disclaimer, the term of this patent is extended or adjusted under 35 U.S.C. 154(b) by 920 days.

(21) Appl. No.: 17/264,538

(22) PCT Filed: Jul. 31, 2019

(86) PCT No.: PCT/US2019/044356
§ 371 (c)(1),
(2) Date: Jan. 29, 2021

(87) PCT Pub. No.: WO2020/028500
PCT Pub. Date: Feb. 6, 2020

(65) Prior Publication Data
US 2021/0332204 A1    Oct. 28, 2021

Related U.S. Application Data

(60) Provisional application No. 62/713,227, filed on Aug. 1, 2018.

(51) Int. Cl.
| | |
|---|---|
| C08J 7/02 | (2006.01) |
| C09J 5/02 | (2006.01) |
| C09J 145/00 | (2006.01) |
| G09F 3/00 | (2006.01) |
| G09F 3/02 | (2006.01) |

(52) U.S. Cl.
CPC . *C08J 7/02* (2013.01); *C09J 5/02* (2013.01); *C09J 145/00* (2013.01); *G09F 3/0291* (2013.01); *C08J 2345/00* (2013.01); *G09F 2003/0257* (2013.01)

(58) Field of Classification Search
CPC ... C08J 7/02; C08J 2345/00; C09J 5/02; C09J 145/00; G09F 3/0291; G09F 2003/0257; B29C 55/06; B32B 27/302; B32B 27/325; B32B 27/08; B32B 27/32; B32B 2307/50; B32B 2307/518; B32B 2307/40; B32B 2307/736; B32B 2307/514; B32B 2307/516; B32B 2307/41; B32B 2519/00; C08L 53/025; C08L 23/16; C08L 2205/03; C11D 3/43; C11D 3/00; C11D 1/00; C11D 3/2068; C11D 3/2096; C11D 7/5022; C11D 7/263; C11D 7/266
See application file for complete search history.

(56) References Cited

U.S. PATENT DOCUMENTS

| | | | |
|---|---|---|---|
| 5,910,528 A * | 6/1999 | Falicoff | C08J 5/122 252/364 |
| 8,975,463 B1 | 3/2015 | Harvey | |
| 2003/0027904 A1 | 2/2003 | Cordova | |
| 2005/0245407 A1 | 11/2005 | Ishihara et al. | |

FOREIGN PATENT DOCUMENTS

| | | |
|---|---|---|
| DE | 20321867 U1 | 12/2011 |
| EP | 3037262 A1 | 6/2016 |

OTHER PUBLICATIONS

International Search Report for international application No. PCT/US2019/044356 dated Oct. 15, 2019.
International Preliminary Report on Patentability of PCT/US2019/044356 dated Feb. 2, 2021.
Comelli, Fabio, et al. "Densities, viscosities, and refractive indices of binary mixtures containing n-hexane+ components of pine resins and essential oils at 298.15 K." Journal of Chemical & Engineering Data 47.1 (2002): 93-97.

* cited by examiner

*Primary Examiner* — Haidung D Nguyen
(74) *Attorney, Agent, or Firm* — Caesar Rivise, PC

(57) ABSTRACT

A solvent blend useable for tackifying a surface of a plastic film includes a terpene based solvent and one or more of a solvent from the group consisting of a straight chain alkane, a branched chain alkane, a cyclic alkane, a substituted cyclic alkane, a straight chain ether, a branched chain ether, a cyclic ether, a substituted cyclic ether, a cyclic diether, a substituted cyclic diether, a straight chain ketone, a branched chain ketone, a cyclic ketone, a substituted cyclic ketone, a straight chain ester, and a branched chain ester.

11 Claims, No Drawings

SOLVENT BLENDS FOR OLEFIN SHRINK FILM SEAMING, SHRINK LABELS FORMED WITH SAID SOLVENT BLENDS AND METHODS OF PROVIDING SEAMS WITH SAID SOLVENT BLENDS

CROSS-REFERENCE TO RELATED APPLICATIONS

This application is a U.S. National Phase Application of PCT/2019/044356, filed Jul. 31, 2019, which claims priority to 62/713,227, filed Aug. 1, 2018, the contents of which applications are incorporated herein by reference in their entireties for all purposes.

TECHNICAL FIELD

The present invention pertains generally to solvent blends for use in tackifying a plastic film, and more specifically to the field of shrink wrap film(s) and related methods that incorporate the solvent blend to form a sealed seam.

BACKGROUND

Shrink labels represent a significant percentage of labelling applications. Within this category, high shrink labels are the fastest growing segment because of the trend towards contoured containers and shrink sleeve labels with 360° graphics. There are two categories of shrink labels: roll fed shrink labels and sleeve labels. Roll fed shrink label films primarily shrink in the MD direction and generally employ biaxially oriented polypropylene films with shrink levels of generally less than 20%. Sleeve labels are typically polymeric films with two ends of the film overlapped and bonded together with solvent to form a seal or seam that results in a sleeve, envelope, or tube configuration that is applied over or around a container. When heat is applied, the label preferentially contracts by about 20% to about 70% and more in the direction extending circumferentially around the container (sleeve labels primarily shrink in the TD direction). Current high shrink sleeve labels are made from TD oriented films which provide 50% or more shrinkage in the TD direction, and are usually based on polyvinyl chloride ("PVC"), glycol modified polyethylene terephthalate ("PETG"), or oriented polystyrene ("OPS").

PVC is the dominant shrink polymer globally because it offers excellent optics, high shrinkage, and very low cost. However, in a recycling operation these shrink labels do not float-separate from plastic containers on which they are employed, such as plastic containers made from polyethylene terephthalate (PET). This results in contamination of the PET during recycling, resulting in a strong push to avoid PVC in packaging and labeling applications for environmental reasons.

PETG offers >70% shrinkage at 95° C. and has excellent optics, machinability, and storage capacity. However, besides being a high cost option, it has the same floatability problem as PVC and, even if ink was removed, PETG should not be recycled with the PET container reclaim because of the different behavior in the bottle manufacturing process. OPS offers low cost and high shrinkage, but optics and rigidity are generally inferior to the other, commercially available film options. The use of OPS also requires climate control for storage and transportation, which is a negative feature of this material.

Recyclers and brand owners are interested in preserving the value of recycled PET employed in the fabrication of containers. Traditional recycling methods often utilize a continuous water flotation process as a means to separate different types of plastic. A shrink label that floats in water allows easy separation from PET bottles and preserves the recyclability of the container.

When PVC shrink labels are applied to PET containers, the flotation separation process cannot be used. This is because both PVC films and PET container material have densities greater than water. Because of their high densities, PVC labels will sink with, rather than separate from, PET containers. Floating is thus not a viable means to separate PVC labels from PET bottles. In addition, as noted earlier, there is a push to avoid PVC packaging because of environmental concerns.

Since PETG and PET have similar characteristics, there is no elegant way to segregate them. Similar to the situation with PVC, PETG has a similar density to PET (both above 1 g/cm$^3$) and therefore cannot be separated using conventional float tank technology.

While OPS offers low cost and high shrinkage, a combination of poor optics, rigidity, and a density greater than 1.0 g/cm$^3$ makes this material undesirable for use in the shrink labeling of containers and other products. The lack of an effective solution to the recyclability issue with existing TD shrink film options is an important issue for a number of large end-users who are strongly pursuing floatable shrink sleeve labels.

Multilayer shrink films with a core layer comprising one or more olefin polymers and at least one skin layer comprising at least one cyclic olefin copolymer have been recently introduced into the market. These films are useful for the manufacture of labels, in particular solvent seamed sleeve labels, which shrink to conform to the shape of a container when heated at temperatures compatible with a steam tunnel. Density of this film is significantly below 1.0 to facilitate easy separation from PET containers during recycling after use.

The art of adhesively seaming overlapping ends of plastic film to make sleeves is fairly well developed. It is understood that the seams should meet certain basic requirements as well as specific requirements for particular products and their containers. These basic requirements include speed and efficiency in manufacturing the sleeves and in applying them to a container. In addition, the integrity of the shrink film seam needs to be maintained during and after its initial manufacturing as well as after shrinking of the film around the container. If not maintained, the seam can partially or totally fail, causing unsightly seams or even seam failure. Additional deficiencies which can occur include:

1. Open seams caused by adhesive skips that are severe enough to result in areas where there is no adhesive.
2. Blocked rolls, a condition which occurs when there is too much adhesive or solvent spread is not under control. The excess adhesive goes outside the overlap seam, adhering the seam area to the next layer on the roll.
3. Uneven seam width, a condition in which the width of the adhesive bead varies, which makes it difficult to seam close to the edge of the film without causing blocked rolls.
4. Weak seams, which result from insufficient adhesive to create a strong bond.
5. Optical defects in the seam region (haziness, white streaks. rough or visible edges)

An ability to meet and exceed these requirements benefits the sleeve manufacturer, the product supplier who applies the sleeves to the containers, and the consumer who purchases the product and opens the container.

There are several different techniques for forming the seam in shrink wrap films. The most common seam forming method utilizes a solvent to form the seam in the polymeric film. The solvent is normally applied to the polymeric shrink film immediately prior to forming the seam, i.e., immediately prior to overlapping the ends and pressing them to be sealed. The solvent rapidly dissolves in and tackifies the polymeric film surface and the film welds to itself when peripheral portions of the film are pressed together.

Although solvent formed seams provide relatively good tack between peripheral film portions to maintain the seam during shrinking of the film, there are a number of drawbacks with currently available solvents solutions:

1. Typical solvent recipes used in these prior art sealing methods with PVC and PETG film include high concentrations of tetrahydrofuran ("THF") in addition to Xylene and Toluene. These are volatile compounds, which pose potential health and environmental concerns and some are subject to environmental regulations.
2. The amount of solvent applied to a seam must be closely controlled. Excess solvent can migrate away from the seam site into other locations on the film. This can cause the film to stick together outside the desired seam site.
3. The solvent can potentially diffuse through the film and come into contact with the substrate of the container to which the label is applied, particularly when high dosing rates are required to produce a sufficient bond. Very often, shrink wrap films are applied to polyethylene terephthalate ("PET") containers. THF is reactive with PET containers and tends to degrade such containers.
4. Conversely, a deficient amount of solvent will form an inadequate seal, causing the seam to separate during film shrinking. Application of solvent to the seam site therefore has to be precisely controlled and monitored.

In addition to the environmental concerns associated with the currently available solvents that produce an effective overlapping seam with PVC, PETG, or OPS films, most of them generally are ineffective in producing strong bonds with good appearance when employed with floatable olefin based shrink films, including multilayer films comprising at least one skin layer with at least one cyclic olefin copolymer therein.

Based on the state of the art a need exists for solvent blends that provide a combination of good bond strength (T-peel and Lap Shear), and also acceptable seam appearance (lack of haze, streaks, lack of zipper defects and uniform seam width control). It is to such solvent blends that the present invention relates.

DESCRIPTION OF THE PREFERRED EMBODIMENT OF THE INVENTION

This invention is a blend of two or more organic solvents being usable to form a welded seam at overlapped, longitudinal edge portions of a multilayer oriented shrink film; preferably a film having a density less than 1.0 g/cm³. In a preferred embodiment of this invention, the multilayer oriented shrink film is a polyolefin based film including a core layer comprising one or more olefin polymers and at least one skin layer comprising at least one cyclic olefin copolymer. A continuous sleeve is formed from the film by folding the film into a tube and then forming the seam at its opposite, overlapped, longitudinal edge portions. Although this invention will be described in connection with its preferred use with multilayer, oriented polyolefin based shrink films including a cyclic olefin copolymer in a skin layer thereof, it should be understood that the solvent blends may have applications in tackifying other types of plastic films including oriented shrink films including materials exposed at their surface other than cyclic olefin copolymer.

The blend of two or more organic solvents usable to form continuous welded seams in accordance with the broadest aspects of this invention is based on the combination of one component selected from the class of naturally occurring organic materials or derivatives known as terpenes and at least one or more components selected from the group consisting of a straight chain alkane, a branched chain alkane, a cyclic alkane, a substituted cyclic alkane, a straight chain ether, a branched chain ether, a cyclic ether, a substituted cyclic ether, a cyclic diether, a substituted cyclic diether, a straight chain ketone, a branched chain ketone, a cyclic ketone, a substituted cyclic ketone, a straight chain ester, and a branched chain ester.

The terpene solvents are known to be "good" solvents for cyclic olefin copolymers while the other, above-identified components are known to be "poor" solvents for cyclic olefin copolymers. These latter components will sometimes be referred to herein as "non-solvents." The most preferred of the non-solvent components for use in tackifying a skin layer including cyclic olefin copolymers therein are the straight chain alkanes, branched chain alkanes, cyclic alkanes and cyclic ethers.

Specific combinations and ratios of one or more terpenes in combination with one and/or the other of aliphatic hydrocarbons and cyclic ethers have been found to be very effective seaming solvents for polyolefin based shrink film with at least one skin layer comprising at least one cyclic olefin copolymer. Specifically, these solvent blends or mixtures provide for the development of:

1. Good seam integrity which is maintained during and after its initial manufacturing as well as after shrink of the film around the container;
2. The absence of open seams caused by adhesive skips severe enough to result in areas where there is no adhesive;
3. Absence of optical defects (hazing, white streaks, rough or visible edges) in the seam region;
4. Uniform seam width with a broad range of seaming line speeds;
5. Absence of roll blocking due to migration (spread) of solvent beyond the edges of the seam or uncontrolled migration through the film; and
6. Ability to form seams with speed and efficiency in the manufacturing of the sleeves and in applying them to a container.

An ability to meet and exceed these requirements benefits the sleeve manufacturer, the product supplier who applies the sleeves to the containers, and the consumer who purchases the product and opens the container.

The use of "bio sourced" terpenes obtained from aromatic plants and spices is preferred, providing for sustainable, comparatively safe solvents, substituting for petroleum solvents typically used in TD shrink sleeve seaming solvents, such as Xylene and Toluene. The introduction of specific combinations of higher evaporation rate "non-solvents" provides for the ability to control/optimize the solvent blend COC solvation strength, contact angle, spread rates, and evaporation rate when applied to the polymer film surface as a seaming solvent to produce a strong weld.

The evaluations carried out in the USA and reported herein were carried out with a three layer film having the following structure:

| Corona treated - printable skin layer (50+ dynes) | |
| --- | --- |
| 6.5-7.5 µm | 40% Topas COC 8007F-600 |
| Print Skin | 60% Topas COC 9506F-500 |
| 30-37 µm | 40% LYB Adsyl 6C30F |
| Core | 26.7% LYB Koattro DP8310M PB-1 copolymer |
| | 33.3% Vistamaxx 3980FL |
| 6.5-7.5 µm | 40% Topas COC 8007F-600 |
| Inner Skin | 60% Topas COC 9506F-500 |

Treated (50+ dynes) or untreated depending on the study

The above three-layer film is oriented to shrink predominately in the transverse direction of formation, and is identified by the prefix "TDS" (transverse direction shrinkage) followed by the film thickness in microns, e.g., 45 (45 micron film) or 50 (50 micron film).

For seaming evaluations conducted in Europe, the film had a core structure slightly different from the above core structure employed in the United States and the skin ratio of Topas COC 8007F-600 and Topas COC 9506F-500 also was slightly different. The structure of the European film was, as follows:

| Corona treated - printable skin layer (50+ dynes) | |
| --- | --- |
| 5.5-6.5 µm | 50% Topas COC 8007F-600 |
| Print Skin | 50% Topas COC 9506F-500 |
| 32-39 µm | 50% LYB Adsyl 7572 XCP |
| Core | 20% LYB Koattro DP8310M PB-1 copolymer |
| | 30% Vistamaxx 3980FL |
| 5.5-6.5 µm | 50% Topas COC 8007F-600 |
| Inner Skin | 50% Topas COC 9506F-500 |

Treated (50+ dynes) or untreated depending on the study

The difference in core structure and skin polymer ratio between the samples tested in the United States and in Europe do not, in applicant's opinion, have any substantive influence on the results observed, or conclusions set forth in this application.

Polymers in the Preparation of TDS Shrink Film

COC Blends—Topas 8007F-600 and 9506F-500 are cyclic-olefin copolymers (COC) incorporating a minor component of linear low density PE to reduce fracture of the brittle pellets during extrusion. COC provides stiffness and solvent seam ability, as well as contributing to the shrink performance of the film. The 8007F grades from Topas have a density of 1.02 g/cc, a Tg of 78° C., and a melt index of 11 dg/min (230° C., 2.16 kg). The 9506F grades from Topas have a density of 1.02 g/cc, a Tg of 65° C. and a melt index of 5.4 dg/min (230° C., 2.16 kg).

Alternate Skin Polymers Employing COC—Apel 8008T and Apel 6509T are cyclic-olefin copolymers of ethylene and substituted Norbornene ($R_1$ and $R_2$ being alkyl or bridging alkylene groups on the Norbornene component in positions 5 and 6). The 8008T grade has a density of 1.02 g/cc, a Tg of 70° C., and a melt index of 15 dg/min (260° C., 2.16 kg). The 6509T grade has a density of 1.02 g/cc, a Tg of 80° C., and a melt index of 30 dg/min (260° C., 2.16 Kg).

A new class of non-crystalline cyclo-olefin block copolymers (CBC) is being commercially introduced in 2018 by USI Group of Taiwan (tradename ViviON). These are ethylene, butene-1, vinyl cyclohexane and ethylene, propylene, vinyl cyclohexane terpolymers with Tg in the range of 70° C. to 150° C.

A third class of non-crystalline cyclic-olefin polymers are COP produced via ring opening metathesis polymerization and hydrogenation. These polymers are commercially available from the Japanese companies ZEON and JSR, sold under the trademarks ZEONEX and ARTON, respectively.

Polypropylene Terpolymer—LyondellBasell Adsyl 6C30F and Adsyl 7572 XCP are Ziegler-Natta catalyzed random terpolymers of propylene, ethylene, and butene. Adsyl 6C30F has a melt flow rate of 5.5 dg/min (230° C., 2.16 kg), a SIT of 98° C., and a DSC peak melting point of 126° C. Adsyl 7572 XCP has a melt flow rate of 5.5 dg/min (230° C., 2.16 kg), a SIT of 92° C., and a DSC peak melting point of 128° C. Terpolymer is a primary component of the core and provides high clarity and is a contributing factor to high shrink performance within the temperature range requirement of heat shrink label applications (90-100° C.).

Polybutene Copolymer—LyondellBasell Koattro DP8310M is a Polybutene-1 copolymer with ethylene. Koattro DP8310M has a melt flow rate of 3.5 dg/min (190° C., 2.16 kg), a melting point of 94° C., and a density of 0.897 g/cc, and is characterized as having a high ethylene content. Polybutene is a primary component of the core and is a contributing factor to high shrink performance within the temperature range requirement of heat shrink label applications (90-100° C.).

Vistamaxx Copolymer—Propylene-based elastomeric copolymers (POE's) are commercially available from ExxonMobil Chemical Company under the trade name Vistamaxx. It is a semi-crystalline copolymer of propylene and ethylene with high propylene levels (>80 wt. %) with isotactic stereochemistry. Vistamaxx 3980F has a melt flow rate (190°/2.16) of 3.2 dg/min, an ethylene content of 9%, a density of 0.879 $g/cm^3$, and a Vicat softening point of 76.7° C.

Seaming Solvents

Primary Solvent—Terpene and Derivatives

Terpenes are a large and diverse class of organic compounds, produced by a variety of plants, particularly conifers. Terpenes may be classified by the number of isoprene units in the molecule; a prefix in the name indicates the number of terpene units needed to assemble the molecule. They are the major components of resin, and of turpentine produced from resin.

Monoterpenes consist of two isoprene units and have the molecular formula $C_{10}H_{16}$. Examples of monoterpenes are limonenes (present in citrus fruits), myrcenes (present in hops), or pinenes (present in pine trees).

α-Pinene is an organic compound of the terpene class, one of two isomers of pinene. It is an alkene and it contains a reactive four-membered ring. It is found in the oils of many species of many coniferous trees, notably the pine. It is also found in the essential oil of rosemary and Satureja. Both enantiomers are known in nature; (1S, 5S)- or (−)-α-pinene is more common in European pines, whereas the (1R, 5R)- or (+)-α-isomer is more common in North America. The racemic mixture is present in some oils such as eucalyptus oil and orange peel oil. Monoterpenes, of which α-pinene is one of the principal species, are emitted in substantial amounts by vegetation, and these emissions are affected by temperature and light intensity.

d-Limonene is a relatively stable terpene and can be distilled without decomposition, although at elevated temperatures it cracks to form isoprene. With sulfur, it undergoes dehydrogenation to p-cymene. Limonene is used as a solvent for cleaning purposes, such as the removal of oil from machine parts, as it is produced from a renewable source (citrus oil, as a byproduct of orange juice manufacture Myrcene, or β-myrcene, is another olefinic natural organic hydrocarbon classified as a monoterpene. Myrcene is a significant component of the essential oil of several plants, including bay, wild thyme, parsley, cardamom, and hops. It is produced mainly semi-synthetically from mycia, from which it gets its name. It is a key intermediate in the production of several fragrances.

p-Cymene is a naturally occurring aromatic organic compound. It is classified as an alkylbenzene related to a monoterpene. Its structure consists of a benzene ring para-substituted with a methyl group and an isopropyl group. There are two less common geometric isomers. o-Cymene, in which the alkyl groups are ortho-substituted, and m-cymene, in which they are meta-substituted. p-Cymene is the only natural isomer. All three isomers form the group of cymenes. p-Cymene is insoluble in water. It is a constituent of a number of essential oils, most commonly the oil of cumin and thyme. Significant amounts are formed in sulfite pulping process from the wood terpenes. Hydrogenation gives the saturated derivative p-Menthane.

p-Menthane is a hydrocarbon with the formula $(CH_3)_2CHC_6H_{10}CH_3$. It is the product of the hydrogenation or hydrogenolysis of various terpenoids, including p-cymene and limonene. It is a colorless liquid with a fragrant fennel-like odor. It occurs naturally, especially in exudates of Eucalyptus fruits. The compound is generally encountered as a mixture of the cis and trans isomers, which have very similar properties.

| Properties | α-Pinene | d-Limonene | Myrcene | p-Cymene | p-Menthane |
|---|---|---|---|---|---|
| Structure | | | | | |
| CAS | 80-56-8 | 5989-27-5 | 125-35-3 | 99-87-6 | 99-82-1 |
| Surface Tension | 25.3 dynes/cm | 25.9 dynes/cm | 23.3 dynes/cm | 28.1 dynes/cm | 23.9 dynes/cm |
| Evaporation Rate | 0.41 (BuAc = 1) | 0.25 (BuAc = 1) | <1 (BuAc = 1) | 0.14 (BuAc = 1) | <1 (BuAc = 1) |
| Molar Mass | 136.24 g-mol$^{-1}$ | 136.24 g-mol$^{-1}$ | 136.24 g-mol$^{-1}$ | 134.21 g-mol$^{-1}$ | 140.27 g-mol$^{-1}$ |
| Appearance | Clear Colorless | Clear Colorless | Clear Colorless | Clear Colorless | Clear Colorless |
| Odor | herbal | orange | pleasant sweet | pleasant mild | fragrant fennel-like |
| Chemical Formula | $C_{10}H_{16}$ | $C_{10}H_{16}$ | $C_{10}H_{16}$ | $C_{10}H_{14}$ | $C_{10}H_{20}$ |
| Density | 0.858 g/cm$^3$ | 0.841 g/cm$^3$ | 0.794 g/cm$^3$ | 0.857 g/cm$^3$ | 0.804 g/cm$^3$ |
| Melting Point | −62.8° C. | −74.4° C. | −10° C. | −68° C. | −89.8° C. |
| Boiling Point | 155° C. | 176° C. | 167° C. | 177° C. | 168° C. |
| Flash Point | 33° C. | 50° C. | 44° C. | 47° C. | 45° C. |
| Solubility in Water | 69 mg/L | 25 mg/L | — | 25 mg/L | — |

Non-Solvent—Type I: Aliphatic Hydrocarbon

Non-solvents—The preferred aliphatic hydrocarbons employed in the present invention are aliphatic alkanes with a boiling point in the range of 30° C. to 140° C., selected from the subclasses of straight chain, branched, cyclic, and substituted cyclic alkanes. More preferably the boiling point is greater than 30° C. and less than 140° C. Specific, non-limiting examples of aliphatic hydrocarbons which meet these criteria are show in the table below.

| Straight Chain Alkanes | BP (° C.) | MP (° C.) | Branched Alkanes | BP (° C.) | MP (° C.) | Cyclo Alkanes | BP (° C.) | MP (° C.) | Substituted Cyclo Alkanes | BP (° C.) | MP (° C.) |
|---|---|---|---|---|---|---|---|---|---|---|---|
| Pentane | 36 | −130 | | | | Cyclopentane | 50 | −94 | Methyl Cyclopentane | 72 | −142 |

-continued

| Straight Chain Alkanes | BP (° C.) | MP (° C.) | Branched Alkanes | BP (° C.) | MP (° C.) | Cyclo Alkanes | BP (° C.) | MP (° C.) | Substituted Cyclo Alkanes | BP (° C.) | MP (° C.) |
|---|---|---|---|---|---|---|---|---|---|---|---|
| Hexane | 69 | −95 | 2,2-Dimethyl butane | 50 | −100 | Cyclohexane | 81 | 6.5 | Methyl Cyclohexane | 101 | −126 |
| | | | 2,3-Dimethyl butane | 58 | −130 | Cycloheptane | 118 | −12 | Ethyl Cyclohexane | 132 | −111 |
| | | | 2-Methyl pentane | 61 | −150 | | | | 1,1-Dimethyl Cyclohexane | 119 | |
| | | | 3-Methyl pentane | 63 | −163 | | | | 1,2-Dimethyl Cyclohexane | 130 | |
| Heptane | 98 | −91 | 2,2-Dimethyl pentane | 78 | | | | | Methyl Cycloheptane | 134 | |
| | | | 2,4-Dimethyl pentane | 80 | −120 | | | | | | |
| | | | 3,3-Dimethyl pentane | 86 | | | | | | | |
| | | | 2,3-Dimethyl pentane | 90 | | | | | | | |
| | | | 3-Methyl hexane | 92 | −119 | | | | | | |
| | | | 3-Ethyl pentane | 94 | −119 | | | | | | |
| | | | 2-Methyl hexane | 98 | −91 | | | | | | |
| Octane | 126 | −57 | 2,2,4-Trimethyl pentane | 99 | −107 | | | | | | |
| | | | 2,5-Dimethyl hexane | 109 | −91 | | | | | | |
| | | | 2-Methyl heptane | 117 | −110 | | | | | | |
| | | | 3-Methyl heptane | 119 | −121 | | | | | | |

Preferred non-solvent—type I aliphatic hydrocarbons within the scope of this invention are the following:

Pentane is an organic compound with the formula $C_5H_{12}$—that is, an alkane with five carbon atoms. The term may refer to any of three structural isomers, or to a mixture of them: in the IUPAC nomenclature, however, pentane means exclusively the n-pentane isomer; the other two are called isopentane (methylbutane) and neopentane (dimethylpropane). Cyclopentane is not an isomer of pentane because it has only 10 hydrogen atoms where pentane has 12.

Pentanes are components of some fuels and are employed as specialty solvents in laboratory applications. Their properties are very similar to those of butanes and hexanes.

Hexane is an alkane of six carbon atoms, with the chemical formula $C_6H_{14}$. The term may refer to any of the five structural isomers with that formula, or to a mixture of them. In IUPAC nomenclature, however, hexane is the unbranched isomer (n-hexane); the other four isomers are named as methylated derivatives of pentane and butane. IUPAC also uses the term as the root of many compounds with a linear six-carbon backbone, such as 2-methylhexane.

Hexanes are significant constituents of gasoline. They are all colorless liquids, odorless when pure, with boiling points between 50 and 70° C. (122 and 158° F.). They are widely used as cheap, relatively safe, largely unreactive, and easily evaporated non-polar solvents.

n-Heptane is the straight-chain alkane with the chemical formula $H_3C(CH_2)_5CH_3$ or $C_7H_{16}$. When used as a test fuel component in anti-knock test engines, a 100% heptane fuel is the zero point of the octane rating scale (the 100 point is a 100% iso-octane).

Cyclohexane is a cycloalkane with the molecular formula $C_6H_{12}$. Cyclohexane is mainly used for the industrial production of adipic acid and caprolactam, which are precursors to nylon. Cyclohexane is a colorless, flammable liquid with a distinctive detergent-like odor, reminiscent of cleaning products (in which it is sometimes used).

| Properties | n-Pentane | n-Hexane | n-Heptane | Cyclohexane |
|---|---|---|---|---|
| Structure | ∧∨∧ | ∧∨∧∨ | ∧∨∧∨∧ | ⬡ |
| CAS | 109-66-0 | 110-54-3 | 142-82-5 | 110-82-7 |
| Surface Tension | 15.9 dynes/cm | 18.4 dynes/cm | 20.3 dynes/cm | 24.9 dynes/cm |
| Evaporation Rate | 28.6 (BuAc = 1) | 8.3 (BuAc = 1) | 4.4 (BuAc = 1) | 5.5 (BuAc = 1) |
| Molar Mass | 75.15 g-mol$^{-1}$ | 86.18 g-mol$^{-1}$ | 100.21 g-mol$^{-1}$ | 84.16 g-mol$^{-1}$ |

| Properties | n-Pentane | n-Hexane | n-Heptane | Cyclohexane |
|---|---|---|---|---|
| Appearance | Clear Colorless | Clear Colorless | Clear Colorless | Clear Colorless |
| Odor | mild gasoline | mild gasoline | mild gasoline | mild gasoline |
| Chemical Formula | $C_5H_{12}$ | $C_6H_{14}$ | $C_7H_{16}$ | $C_6H_{12}$ |
| Density | 0.626 g/cm³ | 0.661 g/cm³ | 0.680 g/cm³ | 0.778 g/cm³ |
| Melting Point | −130° C. | −95° C. | −91° C. | 6.5° C. |
| Boiling Point | 36° C. | 69° C. | 98° C. | 81° C. |
| Flash Point | −49° C. | −26° C. | −4° C. | −20° C. |
| Solubility in Water | 40 mg/L | 9.5 mg/L | Practically Insoluble | Immiscible |

Non-Solvent—Type II: Linear and Heterocyclic Mono and Di Ethers

Non-solvents—Type II linear and heterocyclic mono and di ethers within the scope of this invention are ethers with a boiling point in the range of 30° C. to 145° C., and more preferably being greater than 30° C. and less than 145° C.; selected from the subclasses of straight chain, branched, cyclic, and substituted cyclic ethers. Specific, non-limiting examples of ethers which meet these criteria are show in the table below.

| Straight and Branched Chain Ethers | BP (° C.) | MP (° C.) | Cycloethers | BP (° C.) | MP (° C.) |
|---|---|---|---|---|---|
| Diethyl ether | 34 | −116 | Tetrahydrofuran | 66 | −108 |
| Methyl propyl ether | 39 | | 1,3-Dioxolane | 75 | −95 |
| Methyl isopropyl ether | 51 | | 2-Methyl-1,3-Dioxolane | 82 | |
| Methyl t-butyl ether | 55 | | 1,4-Dioxane | 101 | 12 |
| Methyl isobutyl ether | 59 | | | | |
| Diisopropyl ether | 69 | −60 | | | |
| Methyl n-butyl ether | 70 | −115 | | | |
| t-Amyl methyl ether | 86 | −80 | | | |
| Methyl n-amyl ether | 99 | | | | |
| Diisobutyl ether | 122 | | | | |
| Dibutyl ether | 141 | | | | |

Preferred non-solvent—type II ethers within the scope of this invention are the following:

1, 3-Dioxolane is a heterocyclic acetal with the chemical formula $(CH_2)_2O_2CH_2$. It is related to tetrahydrofuran by interchange of one oxygen for a $CH_2$ group. The corresponding saturated 6-membered $C_4O_2$ rings are called dioxanes. The isomeric 1, 2-dioxolane (wherein the two oxygen centers are adjacent) is a peroxide. 1, 3-Dioxolane is used as a solvent and as a comonomer in polyacetals.

1, 4-Dioxane is a heterocyclic organic compound, classified as an ether. It is a colorless liquid with a faint sweet odor similar to that of diethyl ether. The compound is often called simply dioxane because the other dioxane isomers (1, 2- and 1, 3-dioxane) are rarely encountered.

Dioxane is used as a solvent for a variety of practical applications as well as in the laboratory, and also as a stabilizer for the transport of chlorinated hydrocarbons in aluminum containers.

Tetrahydrofuran (THF), whose preferred IUPAC name was changed in 2013 to Oxolane, is an organic compound with the formula $(CH_2)_4O$. The compound is classified as a heterocyclic compound, specifically cyclic ether. It is a colorless, water-miscible organic liquid with low viscosity. It is mainly used as a precursor to polymers. Being polar and having a wide liquid range, THF is a versatile solvent.

Diethyl Ether is an organic compound in the ether class with the formula $(C_2H_5)_2O$. It is a colorless, highly volatile flammable liquid. It is commonly used as a solvent in laboratories and as a starting fluid for some engines.

Diisopropyl Ether is secondary ether that is used as a solvent. It is a colorless liquid that is slightly soluble in water, but miscible with organic solvents. It is used as an extractant and an oxygenate gasoline additive. It is obtained industrially as a byproduct in the production of isopropanol by hydration of propene.

Dibutyl Ether is a chemical compound belonging to the ether family with the molecular formula of $C_8H_{18}O$. It is colorless, volatile, and flammable liquid and has peculiar ethereal smell. Liquid dibutyl ether is lighter than water. On the other hand, the vapor is heavier than air. It is not soluble in water, but it is soluble in acetone and many other organic solvents. Due to this property, dibutyl ether is used as solvent in various chemical reactions and processes.

| Properties | 1,3-Dioxolane | 1,4-Dioxane | Tetrahydrofuran | Diethyl Ether | Diisopropyl Ether | Dibutyl Ether |
|---|---|---|---|---|---|---|
| Structure | 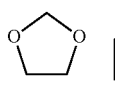 | 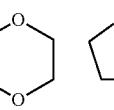 | 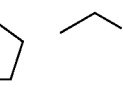 | 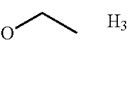 | 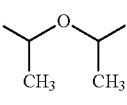 | 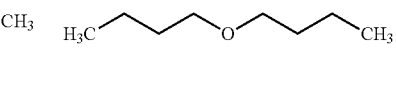 |
| CAS | 646-06-0 | 123-91-1 | 109-99-9 | 60-29-7 | 108-20-3 | 142-96-1 |
| Surface Tension | 34 dynes/cm | 33 dynes/cm | 26.4 dynes/cm | 17 dynes/cm | 17 dynes/cm | 23 dynes/cm |
| Evaporation Rate | 3.5 (BuAc = 1) | 2.2 (BuAc = 1) | 6.3 (BuAc = 1) | 37.5 (BuAc = 1) | 8.1 (BuAc = 1) | |

-continued

| Properties | 1,3-Dioxolane | 1,4-Dioxane | Tetrahydro-furan | Diethyl Ether | Diisopropyl Ether | Dibutyl Ether |
|---|---|---|---|---|---|---|
| Molar Mass | 74.08 g-mol$^{-1}$ | 81.1 g-mol$^{-1}$ | 72.11 g-mol$^{-1}$ | 74.12 g-mol$^{-1}$ | 102.18 g-mol$^{-1}$ | 130.23 g-mol$^{-1}$ |
| Appearance | Clear Colorless | Clear Colorless | Clear Colorless | Clear Colorless | Clear Colorless | Clear Colorless |
| Odor | mild ethereal | faint sweet | mild ethereal | mild ethereal | mild ethereal | Fruity |
| Chemical Formula | $C_3H_6O_2$ | $C_4H_8O_2$ | $C_4H_8O$ | $C_4H_{10}O$ | $C_6H_{14}O$ | $C_8H_{18}O$ |
| Density | 1.06 g/cm$^3$ | 1.03 g/cm$^3$ | 0.889 g/cm$^3$ | 0.713 g/cm$^3$ | 0.725 g/cm$^3$ | 0.77 g/cm$^3$ |
| Melting Point | −95° C. | 12° C. | −108° C. | −116° C. | −60° C. | −95° C. |
| Boiling Point | 75° C. | 101° C. | 66° C. | 35° C. | 69° C. | 141° C. |
| Flash Point | 1.5° C. | 12° C. | −14° C. | −45° C. | −28° C. | 25° C. |
| Solubility in Water | Miscible | Miscible | Miscible | 6 g/100 ml | 2 g/L | 0.3 g/L |

Non-Solvent—Type III: Ketones and Esters

Non-solvents—Type III ketones and esters within the scope of the invention are ketones and esters with a boiling point in the range of 50° C. to 160° C.; more preferably greater than 50° C. and less than 160° C. and selected from the subclasses of straight chain, branched, cyclic, and substituted cyclic ketones and straight and branched chain esters. Specific, non-limiting examples of ethers which meet these criteria are show in the tables below.

| Straight and Branched Chain Ketones | BP (° C.) | MP (° C.) | Cyclic Ketones | BP (° C.) | MP (° C.) | Substituted Cyclic Ketones | BP (° C.) | MP (° C.) |
|---|---|---|---|---|---|---|---|---|
| Acetone | 56 | −95 | Cyclopropanone | 52 | −90 | 2-Methyl cyclopentanone | 140 | |
| Methyl ethyl ketone | 80 | −86 | Cyclobutanone | 100 | −51 | 3-Methyl cyclopentanone | 142 | |
| Methyl isopropyl ketone | 92 | −92 | Cyclopentanone | 131 | −58 | | | |
| Diethyl ketone | 102 | −39 | Cyclohexanone | 156 | −47 | | | |
| Methyl propyl ketone | 102 | −78 | | | | | | |
| Methyl isobutyl ketone | 118 | −85 | | | | | | |
| Diisopropyl ketone | 124 | −69 | | | | | | |
| Methyl n-butyl ketone | 128 | −56 | | | | | | |
| Methyl n-amyl ketone | 151 | −36 | | | | | | |

| Straight and Branched Chain Esters | BP (° C.) | MP (° C.) |
|---|---|---|
| Methyl acetate | 57 | −98 |
| Ethyl acetate | 77 | −84 |
| Methyl propionate | 80 | −88 |
| Isopropyl acetate | 89 | −73 |
| t-Butyl acetate | 98 | −56 |
| Propyl acetate | 102 | −95 |
| Sec-Butyl acetate | 112 | −99 |
| Isobutyl acetate | 118 | −99 |
| Ethyl butyrate | 120 | −93 |
| Butyl acetate | 126 | −78 |
| Isoamyl acetate | 142 | −78 |

Preferred non-solvent—type III ketones and esters within the scope of this invention are the following:

Cyclohexanone is the organic compound with the formula $(CH_2)_5CO$. The molecule consists of six-carbon cyclic molecule with a ketone functional group. This colorless oil has an odor reminiscent of that of acetone. Over time, samples of cyclohexanone assume a yellow color. Cyclohexanone is slightly soluble in water and miscible with common organic solvents. Billions of kilograms are produced annually, mainly as a precursor to nylon.

Methyl Ethyl Ketone (MEK) is an organic compound with the formula $CH_3C(O)CH2CH3$. This colorless liquid ketone has a sharp, sweet odor reminiscent of butterscotch and acetone. It is produced industrially on a large scale, and also occurs in trace amounts in nature. It is soluble in water and is commonly used as an industrial solvent.

Ethyl Acetate is the organic compound with the formula CH3-COO—CH2-CH3, simplified to C4H8O2. This colorless liquid has a characteristic sweet smell (similar to pear drops) and is used in glues, nail polish removers, decaffeinating tea and coffee. Ethyl acetate is the ester of ethanol and acetic acid; it is manufactured on a large scale for use as a solvent.

n-Butyl Acetate, also known as butyl ethanoate, is an ester which is a colorless flammable liquid at room temperature. Butyl acetate is found in many types of fruit, where along with other chemicals it imparts characteristic flavors and has a sweet smell of banana or apple. It is used as a synthetic fruit flavoring in foods such as candy, ice cream, cheeses, and baked goods. Butyl acetate is often used as a high-boiling solvent of moderate polarity.

| Properties | Cyclohexanone | Methyl Ethyl Ketone | Ethyl Acetate | n-Butyl Acetate |
|---|---|---|---|---|
| Structure | | | | |
| CAS | 108-94-1 | 78-93-3 | 141-78-6 | 123-86-4 |
| Surface Tension | 34.5 dynes/cm | 24.6 dynes/cm | 23 dynes/cm | 23 dynes/cm |
| Evaporation Rate | 0.3 (BuAc = 1) | 3.8 (BuAc = 1) | 4.2 (BuAc = 1) | 1.0 (BuAc = 1) |
| Molar Mass | 98.15 g-mol$^{-1}$ | 72.11 g-mol$^{-1}$ | 88.11 g-mol$^{-1}$ | 116.16 g-mol$^{-1}$ |
| Appearance | Clear Colorless | Clear Colorless | Clear Colorless | Clear Colorless |
| Odor | Acetone like | Acetone like | mild ethereal | Fruity |
| Chemical Formula | $C_6H_{10}O$ | $C_4H_8O$ | $C_4H_8O_2$ | $C_6H_{12}O_2$ |
| Density | 0.948 g/cm$^3$ | 0.805 g/cm$^3$ | 0.902 g/cm$^3$ | 0.883 g/cm$^3$ |
| Melting Point | −47° C. | −86° C. | −84° C. | −78° C. |
| Boiling Point | 156° C. | 80° C. | 77° C. | 126° C. |
| Flash Point | 44° C. | −9° C. | −4° C. | 22° C. |
| Solubility in Water | 8.6 g/100 ml | 27.5 g/100 ml | 8.3 g/100 ml | 0.7 g/100 ml |

EXAMPLES

α-Pinene, d-Limonene, and p-Cymene terpene solvents were evaluated alone (reference samples) and in combination with n-Heptane and 1,3-Dioxolane at various ratios. As stated earlier, the solvents were applied by a lab seamer available from Ryback & Ryback, Inc., located at 902 West Franklin Street, Monroe, NC 28110 onto TDS45 film (structure described earlier). Seam width for all films was kept constant at 0.2 inches (5.8 mm). The resulting sleeves were left undisturbed for several hours prior to T-peel and Lap shear testing on a MTS Q-Test/1 L tensile tester. The following results were obtained:

TABLE 1

α-Pinene based blends

| Solvent Recipe (volume ratio) | Seam Width (in) | MD Peel Strength (g/in) Peak | MD Peel Strength (g/in) Peel | Lap Shear Strength Force (lb) | Failure Mode |
|---|---|---|---|---|---|
| Reference #1: 100% α-Pinene | 0.2 | 614 | 431 | 34.4 | Film Break |
| Example #1: 70% α-Pinene/20% Heptane/ 10% 1,3-Dioxolane | 0.2 | 698 | 490 | 32.8 | Film Break |
| Example #2: 60% α-Pinene/20% Heptane/ 20% 1,3-Dioxolane | 0.2 | 682 | 507 | 31.9 | Film Break |
| Example #3: 30% α-Pinene/35% Heptane/ 35% 1,3-Dioxolane | 0.2 | 583 | 510 | 35.0 | Film Break |
| Reference #2: 10% α-Pinene/45% Heptane/ 45% 1,3-Dioxolane | 0.2 | Would not seal | | | |
| Reference #3: 0% α-Pinene/50% Heptane/ 50% 1,3-Dioxolane | 0.2 | Would not seal | | | |

As shown in Table 1, both α-Pinene by itself and in combination with n-Heptane and 1,3-Dioxolane provide strong seam welds of the TDS45 film to itself as measured under both peel force and in lap shear mode. The failure mode described as "Film Break" is an indication that the bond strength of the seam exceeds the tensile strength of the film so the seam remains intact. A fall off in T-peel strength occurs when α-Pinene is diluted with the combined non-solvents down to 20% by volume. Below that level (at 10% or 0% α-Pinene), the film would not seal to itself, reinforcing the fact that n-Heptane and 1,3-Dioxolane are poor solvents for the COC skins.

As shown in Table 2 below, additional combinations of both α-Pinene with increasing levels of n-Heptane and a modest level of 1,3-Dioxolane (10% by volume) provide strong seam welds of the TDS45 film to itself as measured under both peel force and in lap shear mode. The failure mode described as "Film Break" is an indication that the bond strength of the seam exceeds the tensile strength of the film so the seam remains intact. In the evaluation reported in Table 1, above, very high levels of both n-Heptane and 1,3-Dioxolane lead to an inability to produce a seal. In the results reported in Table 2, below, it is shown that high levels of n-Heptane can be introduced with much lower levels of α-Pinene and 1,3-Dioxolane and still maintain high bond strength. This permits adjustment of the evaporation and spread rate of the solvent without adversely impacting seal quality.

TABLE 2

Additional Pinene based blends

| Solvent Recipe (% by Volume) | Seam Width (in) | MD Peel Strength (g/in) Peak | MD Peel Strength (g/in) Peel | Lap Shear Strength Lb-f | Failure mode |
|---|---|---|---|---|---|
| Example #4 80% α-Pinene/10% n-heptane/10% 1,3-dioxolane | 0.245 | 554 | 491 | 25 | Film Break |
| Example #5 70% α-Pinene/20% n-heptane/10% 1,3-dioxolane | 0.245 | 620 | 420 | 28 | |
| Example #6 60% α-Pinene/30% n-heptane/10% 1,3-dioxolane | 0.209 | 698 | 622 | 28 | |
| Example #7 60% α-Pinene/20% n-heptane/20% 1,3-dioxolane | 0.234 | 597 | 384 | 28 | |
| Example #8 50% α-Pinene/40% n-heptane/10% 1,3-dioxolane | 0.234 | 568 | 433 | 27 | |
| Example #9 40% α-Pinene/50% n-heptane/10% 1,3-dioxolane | 0.234 | 534 | 453 | 27 | |
| Example #10 20% α-Pinene/70% n-heptane/10% 1,3-dioxolane | 0.234 | 527 | 404 | 25 | |
| Average | | 585 | 458 | 26.9 | |

As shown in Table 3 below, additional combinations of both α-Pinene with increasing levels of n-Heptane and a higher level of 1,3-Dioxolane (20%) provide strong seam welds of the TDS45 film to itself, as measured under both peel force and in lap shear mode, up to 40% n-Heptane. The failure mode described as "Film Break" is an indication the bond strength of the seam exceeds the tensile strength of the film so the seam remains intact. At still higher level of n-Heptane, there is a quantifiable reduction in bond strength and the failure mode in lap shear shifts to Seal Break, as opposed to Film Break. This indicates that with the three component blends including higher levels of diether the operating range of aliphatic hydrocarbon is reduced.

TABLE 3

Additional Pinene Based Blends

| Solvent Recipe (% by Volume) | Seam Width | MD Peel Strength (g/in) Peak | MD Peel Strength (g/in) Peel | Lap Shear Strength Lb-f | Failure mode |
|---|---|---|---|---|---|
| Example #11 70% α-Pinene/10% n-heptane/20% 1,3-dioxolane | 0.188 | 728 | 623 | 25 | Film Break |
| Example #12 60% α-Pinene/20% n-heptane/20% 1,3-dioxolane | 0.193 | 499 | 388 | 28 | |
| Example #13 50% α-Pinene/30% n-heptane/20% 1,3-dioxolane | 0.158 | 653 | 543 | 28 | |
| Example #14 40% α-Pinene/40% n-heptane/20% 1,3-dioxolane | 0.158 | 691 | 389 | 28 | |
| Average | | 643 | 486 | 27.3 | |
| Reference #4 30% α-Pinene/50% n-heptane/20% 1,3-dioxolane | 0.225 | 338 | 248 | 13 | Seal Break |
| Reference #5 20% α-Pinene/60% n-heptane/20% 1,3-dioxolane | 0.224 | 321 | 239 | 19 | |
| Reference #6 10% α-Pinene/70% n-heptane/20% 1,3-dioxolane | 0.160 | Would not Seal | | 19 | |

Table 4 shows the influence of diether concentration on the maximum level of aliphatic hydrocarbon to achieve high bond strengths. Additional combinations of both α-Pinene with increasing levels of n-Heptane and a still higher level of 1,3-Dioxolane (30%) provide strong seam welds of the TDS45 film to itself, as measured under both peel force and in lap shear mode, up to 30% n-Heptane. The failure mode described as "Film Break" is an indication the bond strength of the seam exceeds the tensile strength of the film so the seam remains intact. At still higher level of n-Heptane, there is a quantifiable reduction in bond strength and the failure mode in lap shear shifts to Seal Break from Film Break. This again indicates that with the three component blends with higher levels of diether the operating range of aliphatic hydrocarbon is reduced.

TABLE 4

Additional Pinene Based Blends

| Solvent Recipe (% by Volume) | Seam Width | MD Peel Strength (g/in) Peak | MD Peel Strength (g/in) Peel | Lap Shear Strength Lb-f | Failure mode |
|---|---|---|---|---|---|
| Example #15 60% α-Pinene/10% n-heptane/30% 1,3-dioxolane | 0.189 | 655 | 553 | 28 | Film Break |
| Example #16 50% α-Pinene/20% n-heptane/30% 1,3-dioxolane | 0.219 | 537 | 399 | 29 | |
| Example #17 40% α-Pinene/30% n-heptane/30% 1,3-dioxolane | 0.219 | 455 | 345 | 27 | |
| Average | | 549 | 432 | 28 | |
| Reference #7 30% α-Pinene/40% n-heptane/30% 1,3-dioxolane | 0.160 | 390 | 334 | 26 | Seal Break |
| Reference #8 20% α-Pinene/50% n-heptane/30% 1,3-dioxolane | 0.168 | 335 | 263 | 30 | |

TABLE 4-continued

Additional Pinene Based Blends

| Solvent Recipe (% by Volume) | Seam Width | MD Peel Strength (g/in) Peak | Peel | Lap Shear Strength Lb-f | Failure mode |
|---|---|---|---|---|---|
| Reference #9 10% α-Pinene/60% n-heptane/30% 1,3-dioxane | 0.175 | 347 | 219 | 10 | |

In addition to the three component blends of a terpene, aliphatic hydrocarbon, and polar component selected from ether, ketone, and ester classes; two component blends within a defined range of volume ratios are very effective in producing strong seaming bonds of the film to itself. This is illustrated in Table 5 below, in which combinations of α-Pinene and n-Heptane were tested for bond performance. Up to 60% by volume of the aliphatic hydrocarbon can be introduced to influence the solvent blend spread and evaporation rate while maintaining a high level of bond strength as measured by both peel and lap shear testing. Higher levels of n-Heptane begin to deteriorate the bond strength.

TABLE 5

Additional Pinene Based Blends (2 components)

| Solvent Recipe (% by Volume) | Seam Width | MD Peel Strength (g/in) Peak | Peel | Lap Shear Strength Lb-f | Failure mode |
|---|---|---|---|---|---|
| Reference #1 100% α-Pinene | 0.192 | 657 | 552 | 27 | Film Break |
| Example #18 90% α-Pinene/ 10% n-heptane | 0.181 | 781 | 653 | 29 | Film Break |
| Example #19 80% α-Pinene/ 20% n-heptane | 0.181 | 597 | 469 | 28 | |
| Example #20 70% α-Pinene/ 30% n-heptane | 0.181 | 635 | 492 | 27 | |
| Example #21 60% α-Pinene/ 40% n-heptane | 0.189 | 640 | 553 | 28 | |
| Example #22 50% α-Pinene/ 50% n-heptane | 0.206 | 728 | 587 | 28 | |
| Example #23 40% α-Pinene/ 60% n-heptane | 0.185 | 649 | 531 | 28 | |
| Average | | 672 | 548 | 28 | |
| Reference #10 30% α-Pinene/ 70% n-heptane | 0.241 | 344 | 240 | 26 | |
| Reference #11 20% α-Pinene/ 80% n-heptane | 0.230 | 453 | 374 | 18 | Seam Break |
| Reference #12 10% % α-Pinene/ 90% n-heptane | 0.185 | 595 | 493 | 17 | |
| Reference #13 100% n-heptane | 0.251 | 201 | 158 | 20 | |

Table 6 below illustrates the influence of terpene dilution with a diether (1,3-Dioxolane). Once again, up to 60% by volume of the diether can be introduced to influence the solvent blend spread and evaporation rate while maintaining a high level of bond strength as measured by both peel and lap shear testing. Higher levels of the diether (non-solvent) begin to deteriorate the bond strength. At 100% 1,3-Dioxolane, the film would not form a seal.

TABLE 6

Additional Pinene Based Blends (2 components)

| Solvent Recipe (% by Volume) | Seam Width | MD Peel Strength (g/in) Peak | Peel | Lap Shear Strength Lb-f | Failure mode |
|---|---|---|---|---|---|
| Example #24 90% α-Pinene/10% 1,3-Dioxolane | 0.204 | 603 | 418 | 30 | Film Break |
| Example #25 80% α-Pinene/20% 1,3-Dioxolane | 0.198 | 564 | 438 | 23 | |
| Example #26 70% α-Pinene/30% 1,3-Dioxolane | 0.232 | 477 | 359 | 28 | |
| Example #27 60% α-Pinene/40% 1,3-Dioxolane | 0.218 | 461 | 354 | 30 | |
| Example #28 50% α-Pinene/50% 1,3-Dioxolane | 0.218 | 520 | 371 | 23 | |
| Example #29 40% α-Pinene/60% 1,3-Dioxolane | 0.218 | 792 | 697 | 30 | |
| Average | | 570 | 440 | 27.3 | |
| Reference #14 30% α-Pinene/70% 1,3-Dioxolane | 0.218 | 358 | 280 | 29 | |
| Reference #15 20% α-Pinene/80% 1,3-Dioxolane | 0.218 | 228 | 171 | 29 | |
| Reference #16 10% % α-Pinene/90% 1,3-Dioxolane | 0.202 | 67 | 35 | 16 | Seam Break |
| Reference #17 100% 1,3-Dioxolane | — | Would not seam | | | |

Table 7 below illustrates the performance of α-Pinene dilution with a combination of n-Heptane and other polar poor solvents selected from ether (THF—Tetrahydrofuran), ketone (MEK—Methyl ethyl ketone and Cyclohexanone), and ester (Ethyl Acetate). The results reported in Table 7 are self-evident; requiring no further discussion.

TABLE 7

Additional Pinene Based Blends (alternative polar poor solvent component)

| Solvent Recipe (% by Volume) | Seam Width | MD Peel Strength (g/in) Peak | Peel | Lap Shear Strength Lb-f | Failure mode |
|---|---|---|---|---|---|
| Example #30 60% α-Pinene/20% n-heptane/20% 1,3-Dioxolane | 0.205 | 712 | 643 | 30 | Film Break |
| Example #31 60% α-Pinene/20% n-heptane/20% Tetrahydrofuran | 0.219 | 539 | 452 | 27 | |
| Example #32 60% α-Pinene/20% n-heptane/20% Cyclohexanone | 0.194 | 598 | 531 | 26 | |
| Example #33 60% α-Pinene/20% n-heptane/20% Methyl Ethyl Ketone | 0.194 | 619 | 500 | 26 | |

TABLE 7-continued

Additional Pinene Based Blends (alternative polar poor solvent component)

| Solvent Recipe (% by Volume) | Seam Width | MD Peel Strength (g/in) | | Lap Shear Strength Lb-f | Failure mode |
|---|---|---|---|---|---|
| | | Peak | Peel | | |
| Example #34 60% α-Pinene/20% n-heptane/20% Ethyl Acetate | 0.194 | 753 | 644 | 31 | |

As indicated in Table 8 below, a similar set of experiments were conducted with the terpene d-Limonene, by itself and in combination with n-Heptane and 1,3-Dioxolane as seaming solvents for TDS45 film to itself. The absolute values for bond strengths are lower across the board as compared to the use of α-Pinene as the terpene, as reported above. However, the pattern is similar. Dilution of d-Limonene down to 40 vol % with a combination of n-Heptane and 1, 3-Dioxolane maintained an acceptable level of T-peel performance and Lap Shear strength with retention of the seam when the film was broken. Further reduction to 30% d-Limonene or less created seal breaks prior to film breaks in the lap shear test, indicating insufficient bonding in the seam. The breadth of the operating window with d-Limonene based blends is narrowed somewhat relative to α-Pinene.

TABLE 8 d-Limonene based blends

| Solvent Recipe (% by Volume) | Seam Width | MD Peel Strength (g/in) | | Lap Shear Strength Lb-f | Failure mode |
|---|---|---|---|---|---|
| | | Peak | Peel | | |
| Reference #18 100% d-Limonene | 0.205 | 402 | 274 | 27 | Film Break |
| Example #35 70% d-Limonene/10% n-heptane/20% 1,3-dioxolane | 0.235 | 430 | 300 | 26 | Film Break |
| Example #36 50% d-Limonene/10% n-heptane/40% 1,3-dioxolane | 0.202 | 557 | 422 | 28 | |
| Example #37 60% d-Limonene/20% n-heptane/20% 1,3-dioxolane | 0.202 | 512 | 406 | 25 | |
| Example #38 40% d-Limonene/20% n-heptane/40% 1,3-dioxolane | 0.195 | 462 | 371 | 28 | |
| Average | | 490 | 375 | 27 | |
| Reference #19 30% d-Limonene/35% Heptane/35% 1,3-Dioxolane | | 311 | 208 | 23.0 | Seal Break |
| Reference #20 20% d-Limonene/40% Heptane/40% 1,3-Dioxolane | | 367 | 238 | 20.9 | |

Table 9 below illustrates the performance of d-Limonene dilution with a combination of n-Heptane and other polar poor solvents selected from ether (THF—Tetrahydrofuran), ketone (MEK—Methyl ethyl ketone and Cyclohexanone), and ester (Ethyl Acetate).

TABLE 9

Additional Limonene Based Blends (alternative polar poor solvent component)

| Solvent Recipe (% by Volume) | Seam Width | MD Peel Strength (g/in) | | Lap Shear Strength Lb-f | Failure mode |
|---|---|---|---|---|---|
| | | Peak | Peel | | |
| Example #39 60% d-Limonene/20% n-heptane/20% 1,3-Dioxolane | 0.200 | 590 | 417 | 28 | Film Break |
| Example #40 60% d-Limonene/20% n-heptane/20% Tetrahydrofuran | 0.209 | 453 | 356 | 27 | |
| Example #41 60% d-Limonene/20% n-heptane/20% Cyclohexanone | 0.220 | 850 | 773 | 28 | |
| Example #42 60% d-Limonene/20% n-heptane/20% Methyl Ethyl Ketone | 0.200 | 512 | 378 | 27 | |
| Example #43 60% d-Limonene/20% n-heptane/20% Ethyl Acetate | 0.200 | 523 | 427 | 28 | |

As indicated in Table 10, employing Myrcene as the terpene, by itself and in combination with n-Heptane and 1,3-Dioxolane also produces very effective seaming solvents for TDS45 film to itself. T-peel performance overall is intermediate between the performance of α-pinene blends and d-limonene blends, while lap shear bond strength exceeds the strength of the film with strength values comparable to the prior solvent blends employing α-pinene and d-limonene as the terpene.

TABLE 10

Myrcene based blends

| Solvent Recipe (% by Volume) | Seam Width | MD Peel Strength (g/in) | | Lap Shear Strength Lb-f | Failure mode |
|---|---|---|---|---|---|
| | | Peak | Peel | | |
| Reference #21 100% Myrcene | 0.198 | 366 | 277 | 28 | Film Break |
| Example #44 80% Myrcene/10% n-heptane/10% 1,3-dioxolane | 0.209 | 468 | 288 | 27 | Film Break |
| Example #45 70% Myrcene/20% n-heptane/10% 1,3-dioxolane | 0.209 | 468 | 316 | 27 | |
| Example #46 60% Myrcene/30% n-heptane/10% 1,3-dioxolane | 0.214 | 446 | 321 | 28 | |
| Example #47 50% Myrcene/40% n-heptane/10% 1,3-dioxolane | 0.200 | 392 | 235 | 24 | |
| Example #48 60% Myrcene/20% n-heptane/20% 1,3-dioxolane | 0.200 | 383 | 288 | 28 | |
| Example #49 40% Myrcene/30% n-heptane/30% 1,3-dioxolane | 0.194 | 555 | 430 | 28 | |
| Example #50 30% Myrcene/35% n-heptane/35% 1,3-dioxolane | 0.181 | 330 | 235 | 25 | |
| Average | | 434 | 302 | 26.7 | |

As indicated in Table 11, employing p-Cymene as the terpene, by itself and in combination with n-Heptane and 1,3-Dioxolane as seaming solvents for TDS45, the absolute values for bond strengths are lower across the board as compared to the use of the earlier discussed terpenes. However, the pattern is similar. Dilution of p-Cymene down to 30 vol % with a combination of n-Heptane and 1,3-Dioxolane maintained an acceptable level of T-peel performance and Lap Shear strength with retention of the seam when the film was broken. Lap shear seal breaks occur prior to film break when the p-cymene is further diluted to 20% by volume.

TABLE 11 p-Cymene based blends

| Solvent Recipe (volume ratio) | Seam Width (in) | MD Peel Strength (g/in) Peak | MD Peel Strength (g/in) Peel | Lap Shear Strength Force (lb) | Lap Shear Strength Failure Mode |
|---|---|---|---|---|---|
| Reference #22 100% p-cymene | 0.2 inches | 405 | 309 | 31.9 | Film Break |
| Example #51 60% p-cymene/30% Heptane/ 10% 1,3-Dioxolane | | 260 | 198 | 30.6 | Film Break |
| Example #52 45% p-cymene/35% Heptane/ 20% 1,3-Dioxolane | | 304 | 210 | 28.2 | Film Break |
| Example #53 30% p-cymene/35% Heptane/ 35% 1,3-Dioxolane | | 264 | 185 | 28.0 | Film Break |
| Reference #23 20% p-cymene/40% Heptane/ 40% 1,3-Dioxolane | | 194 | 142 | 23.0 | Seal Break |

It also is within the scope of this invention to employ more than one terpene solvent in combination with hydrocarbon and/or cyclic ether non-solvent combinations, as indicated in Table 12, where good overall performance is observed with combinations of α-Pinene and p-Cymene with the remaining component being n-Heptane, or combinations of α-Pinene and d-Limonene with the remaining solvent being a split of equal volume of n-Heptane and 1,3-Dioxolane.

TABLE 12

Combination of Terpenes

| Solvent Recipe (volume ratio) | Seam Width (in) | MD Peel Strength (g/in) Peak | MD Peel Strength (g/in) Peel | Lap Shear Strength Force (lb) | Lap Shear Strength Failure Mode |
|---|---|---|---|---|---|
| Example #54 35% α-Pinene/35% p-Cymene/30% Heptane | 0.200 | 579 | 421 | 34 | Film Break |
| Example #55 50% α-Pinene/10% d-Limonene/20% n-heptane/20% 1,3-dioxolane | 0.196 | 718 | 566 | 26 | |
| Example #56 40% α-Pinene/20% d-Limonene/20% n-heptane/20% 1,3-dioxolane | 0.209 | 483 | 314 | 28 | |
| Example #57 30% α-Pinene/30% d-Limonene/20% n-heptane/20% 1,3-dioxolane | 0.217 | 588 | 426 | 27 | |
| Example #58 20% α-Pinene/40% d-Limonene/20% n-heptane/20% 1,3-dioxolane | 0.177 | 599 | 475 | 28 | |
| Example #59 10% α-Pinene/50% d-Limonene/20% n-heptane/20% 1,3-dioxolane | 0.177 | 487 | 339 | 26 | |
| Example #60 60% d-Limonene/20% n-heptane/20% 1,3-dioxolane | 0.194 | 545 | 381 | 27 | |
| Average | | 571 | 417 | 28 | |

Several additional seaming trials were conducted on commercial seaming equipment employing solvents consisting of pure α-Pinene, pure THF, commercially available Flexcraft 14-98 and 1518 with TDS45 shrink film described earlier. Results are shown in Table 13 below: The Flexcraft solvents, to the best of applicant's knowledge do not include a terpene or derivative thereof, and are believed to include one or more aromatics with other solvent components.

TABLE 13

Seaming Trials with Commercial Seaming Equipment

| Seaming Equipment | Solvent Recipe | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|
| Karlville seamer Felt applicator Area Sleeve | Reference #24: 100% α-Pinene Minimum rate 300 meters/min | 0.102 | Seam whiteness is visible | 516 | 416 | 30.5 | Seal Break |
| Karlville seamer Felt applicator Folienprint | Reference #25: 100% THF | 0.125 | Seam whiteness but less visible than ref#8 | 136 | 99 | 19.7 | Seal Break |

TABLE 13-continued

Seaming Trials with Commercial Seaming Equipment

| Seaming Equipment | Solvent Recipe | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|
| Accraply Seamer Felt applicator Brook & Whittle | Reference #26: Flexcraft 14-98 5 ml/min at max rate 200 meters/min | 0.187 | Seam whiteness is visible | 517 | 474 | 26.6 | Film Break |
|  | Reference #27: Flexcraft 14-98 3 ml/min at max rate 300 meters/min | 0.170 | Seam whiteness is visible | 220 | 188 | 24.8 | Film Break |
|  | Reference #28: Flexcraft 1518 5 ml/min at max rate 200 meters/min | 0.194 | Seam whiteness is visible | 279 | 233 | 24.2 | Film Break |

Results indicated in Table 13 is a summary of T-peel and Lap Shear testing conducted on laboratory test devices. In all cases, seam appearance was sub-optimal and not considered commercially acceptable because of varying degrees of whiteness in the seam. T-peel performance of both α-Pinene and Flexcraft 14-98 (at least at low speed) was very good. Both THF and Flexcraft 1518 performed poorly in T-peel and the THF seamed samples also failed at the seam under Lap Shear stress, which is not acceptable. Surprisingly, the α-Pinene seamed sample from Arca Sleeve performed well in T-peel but seam failure in Lap Shear occurred. A trial was conducted with an Accraply commercial seamer at Accraply Inc. in Plymouth, MN to provide a side by side comparison of the following solvents under typical commercially feasible film seaming conditions:
  1) Commercially available Flexcraft 14-98 seaming solvent alone
  2) "Environmentally friendly" α-Pinene solvent alone and
  3) α-Pinene in combination with Heptane and 1,3-Dioxolane.

A total of four solvent recipes were run with needle and felt delivery methods and varying line rates up to 400 meters per minute.

The Accraply seamer (Stanford ASFC) uses a sophisticated micro gear pump to accurately control solvent flow over a very broad range of solvent delivery rates.
Results:

An experimental matrix was designed in advance of the above trial to capture what was considered to be the most relevant variables in the seaming step:
  1. Solvent recipe
  2. Solvent delivery rate
  3. Method of solvent delivery (felt wick vs needle)
  4. Seamer line speed Flexcraft 14-98 solvent blend was employed; being one of the better known commercial seaming solvent available for polyolefin based film structures. In addition, 100% α-Pinene was employed as a reference; having performed acceptably in prior seaming trials described before. This latter solvent is considered an "environmentally friendly" solvent because of its sustainable sourcing from pine trees and its relatively low toxicity rating. The following two solvent blend formulations also were employed: (1) a blend containing 60% α-Pinene/20% Heptane/20% 1, 3-Dioxolane and (2) a blend containing 52.7% α-Pinene/17.6% Heptane/29.7% 1, 3-Dioxolane. Heptane and 1, 3-Dioxolane have relatively low toxicity ratings. Relevant properties of these solvent components are as follows:

| Solvent | Boiling Point | Evap. Rate (BuAc = 1) |
|---|---|---|
| α-Pinene | 155° C. | 0.4 |
| Heptane | 98° C. | 4.4 |
| 1,3-Dioxolane | 75° C. | 3.5 |

Both Heptane and 1,3-Dioxolane have lower boiling points than α-Pinene, have higher evaporation rates than α-Pinene, and have poorer solubility in COC resin than α-Pinene. Blending in one or both of these solvents with α-Pinene provides a means for controlling evaporation rate, tackifying behavior, and surface spread of the solvent.

For each of the solvents, the following experimental matrix was outlined for the study:

| Delivery Method | Flow Rate(ml/min) | Line Speed(m/min) |
|---|---|---|
| Needle | Low | 100/250-300/400 |
|  | Medium | 100/250-300/400 |
|  | High | 100/250-300/400 |

-continued

| Delivery Method | Flow Rate(ml/min) | Line Speed(m/min) |
|---|---|---|
| Felt | Low | 100/250-300/400 |
| | Medium | 100/250-300/400 |
| | High | 100/250-300/400 |

The seaming machine employed in the trial was Stanford Model ASFC; having a maximum line speed of 400 meters/min. A 30 gauge needle, at 45° angle of inclination, was used in this study in addition to a felt applicator. Film lay flat width (112.5 millimeters) was selected to produce a constant 5 millimeter overlap with and a seam width of 2-3 millimeters (length of bonding in the overlap) was targeted. In other words, the bonded area should be less than the overlap so as to avoid tacky regions outside of the overlap.

The matrix study began with Flexcraft 14-98 applied to a clear film; employing both needle and felt delivery methods. Both medium (15 ml/min max) and high (25 ml/min max) solvent delivery rates were run from low (100 m/min) to med (250-300 m/min) to high (400 m/min) line rates. The 14-98 solvent tended to stay in place (limited spread) and bond appearance was fair (some haziness and streaking was observed for all of the felt applied seams and some of the needle applied seams). This bond appearance was considered to be of a commercially inferior quality.

TABLE 14

Testing of Flexcraft 14-98 seaming solvent

| Solvent Recipe (% by Volume) | Application Method | Solvent Flow Rate | Line Rate (m/min) | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|---|---|
| Reference #29: Flexcraft 14-98 | Needle | 15 ml/min at max speed | 100 | 0.109 | All samples very clear, no marking | 508 | 417 | 26 | Film Break |
| | | | 300 | 0.109 | | 404 | 332 | 34 | |
| | | | 400 | 0.109 | | 321 | 270 | 24 | |
| | | 25 ml/min at max speed | 100 | 0.115 | Clear at 100/300 m/min, cloudy at 400 m/min | 285 | 237 | 26 | Film Break |
| | | | 250 | 0.140 | | 380 | 319 | 30 | |
| | | | 400 | 0.122 | | 305 | 216 | 22 | |
| | Felt | 15 ml/min at max speed | 100 | 0.151 | Very cloudy, streaked lanes at all speeds | 401 | 331 | 29 | Film Break |
| | | | 300 | 0.169 | | 399 | 351 | 29 | |
| | | | 400 | 0.132 | | 398 | 342 | 28 | |
| | | 25 ml/min at max speed | 100 | 0.155 | Very cloudy, streaked lanes at all speeds | 401 | 329 | 27 | Film Break |
| | | | 250 | 0.155 | | 332 | 286 | 24 | |
| | | | 400 | 0.149 | | 286 | 234 | 21 | |
| | | | | | Average | 368 | 305 | | |

Despite the visual deficiencies noted in the seam area, bond strength was considered to be acceptable in both T-peel mode and Lap Shear mode with the overlap seal remaining intact (film break).

A second evaluation employed 100% α-Pinene with both needle and felt delivery at line speeds of 100 m/min, 250 m/min, and 400 m/min. α-Pinene was initially run at the same medium (15 ml/min max) and high (25 ml/min max) solvent delivery rates used with Flexcraft 14-98.

The α-Pinene exhibited a very strong spread rate in comparison to Flexcraft 14-98 and flowed outside the edges of the overlap seam and partially destroyed the film surface. The solvent did not have sufficient time to dry completely before the rewind station, the seaming line looked milky/white, and the wound sleeve tube exhibited blocking. The use of α-Pinene was determined to be unacceptable when employing the above line speeds and solvent delivery rates. The solvent delivery rate was adjusted to a much lower setting (5 ml/min max) and an air flow system was employed to improve the solvent drying. However, the α-Pinene still exhibited a strong tendency to spread-out to fill the overlap. See Table 15.

TABLE 15

Testing of α-Pinene seaming solvent at low solvent delivery rate

| Solvent Recipe (% by Volume) | Application Method | Solvent Flow Rate | Line Rate (m/min) | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|---|---|
| Reference #30: 100% α-Pinene | Needle | 5 ml/min at max speed | 100 | 0.177 | All samples very clear, no marking | 568 | 510 | 33 | Film Break |
| | | | 250 | 0.175 | | 545 | 471 | 30 | |
| | | | 400 | 0.177 | | 661 | 591 | 26 | |
| | Felt | 5 ml/min at max speed | 100 | 0.178 | | 531 | 464 | 23 | Film Break |
| | | | 250 | 0.178 | | 570 | 487 | 28 | |
| | | | 400 | 0.178 | | 627 | 539 | 26 | |
| | | | | | Average: | 584 | 510 | | |

A third evaluation employed a blend of 60% α-Pinene/20% n-Heptane/20% 1,3-Dioxolane. This ratio of the three solvents is the same ratio used in earlier internal screening experiments (example #2). The solvents were applied onto TDS45 film by a lab seamer available from Ryback & Ryback, Inc., located at 902 West Franklin Street, Monroe, NC 28110. In that earlier evaluation, the blend produced a higher T-peel strength as compared to 100% α-Pinene. In this side by side comparison on a commercial seaming unit under the same conditions of low solvent delivery rate (5 ml/min max) and line speed of 100 m/min, 250 m/min, and 400 m/min, excellent seam appearance was obtained and the average T-peel bond strength exceeded the performance of α-Pinene alone. See Table 16.

vent delivery rate significantly, as described above in connection with the pure α-Pinene solvent to keep it from flowing uncontrollably out of the seam area, is one approach for addressing this problem. However, many of the commercial seaming machines used in the industry do not have the level or range of control possible with the Accraply seamer, which employs a program controlled micro gear pump. For this later blend, the intermediate solvent delivery rate (15 ml/min max) was employed; that rate being unacceptable with a solvent of pure α-Pinene. Specifically, with pure α-Pinene the flow was uncontrollable at this intermediate solvent deliver rate; causing flow outside the seam edge and undesired blocking. Once again line rates of 100 m/min, 250 m/min, and 400 m/min were tested. With the

TABLE 16

Testing of α-Pinene seaming solvent blend (intermediate α-Pinene level)

| Solvent Recipe (% by Volume) | Application Method | Solvent Flow Rate | Line Rate (m/min) | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|---|---|
| Example #61: 60% - Pinene 20% n-Heptane 20% 1,3-Dioxolane | Needle | 5 ml/min at max speed | 100 | 0.156 | All samples very clear, no marking | 856 | 781 | 30 | Film Break |
| | | | 250 | 0.167 | | 758 | 653 | 30 | |
| | | | 400 | 0.189 | | 510 | 471 | 31 | |
| | Felt | 5 ml/min at max speed | 100 | 0.235 | | 673 | 600 | 28 | Film Break |
| | | | 250 | 0.232 | | 555 | 510 | 25 | |
| | | | 400 | 0.195 | | 472 | 439 | 25 | |
| | | | | | Average | 637 | 578 | | |

In a further test additional 1,3-Dioxolane was added to the above identified solvent blend of Pinene/Heptane/Dioxolane to formulate a blend of 52.7% α-Pinene/17.6% Heptane/29.7% 1,3-Dioxolane.

The objective of this test was to investigate the ability to influence solvent spread tendency by adjusting the level of "non-solvent" introduced into the blend. Reducing the solneedle delivery method, bond appearance was good (clear seams, no markings) while with the felt delivery method, some light whitening was observed. These results establish that the spread behavior of the terpene solvent can be controlled with the introduction of one or more "non-solvents" in a blend. See Table 17 below.

TABLE 17

Testing of α-Pinene seaming solvent blend (lower α-Pinene level)

| Solvent Recipe (% by Volume) | Solvent Application Method | Flow Rate | Line Rate (m/min) | Seam Width (in) | Seam Appearance | MD Peel Strength (g/in) Peak | MD Peel Strength (g/in) Peel | Lap Shear Strength Force (lb) | Lap Shear Strength Failure Mode |
|---|---|---|---|---|---|---|---|---|---|
| Example 62: 52.7% α-Pinene 17.6% n-Heptane 29.7% 1,3-Dioxolane | Needle | 15 ml/min at max speed | 100 | 0.131 | All samples very clear, no marking | 438 | 388 | 29 | Film Break |
| | | | 250 | 0.137 | | 587 | 528 | 28 | |
| | | | 400 | 0.137 | | 399 | 339 | 29 | |
| | Felt | 15 ml/min at max speed | 100 | 0.156 | Light whiteness in seal lane | 452 | 404 | 25 | Film Break |
| | | | 250 | 0.155 | | 555 | 502 | 27 | |
| | | | 400 | 0.169 | | 704 | 628 | 28 | |
| | | | | | Average | 523 | 464 | | |

Although the present invention has been described in connection with preferred embodiments thereof, it will be appreciated by those skilled in the art that additions, modifications, substitutions and deletions not specifically described may be made without departing from the spirit and scope of the invention defined in the appended claims.

What is claimed as the invention is:

1. A solvent blend useable for tackifying a surface of a multilayer oriented shrink film, said solvent blend comprising:
    20-80 vol. % of at least one terpene selected from the group consisting of α-Pinene and d-Limonene;
    10-70 vol. % of n-heptane;
    10-40 vol. % of at least one compound selected from the group consisting of 1,3-dioxolane, 1,4-dioxane, tetrahydrofuran, methyl ethyl ketone, cyclohexanone and ethyl acetate,
    wherein the solvent blend is free of any other terpene, alkane, ether, ketone or ester, and the solvent blend is free of:
    30% α-Pinene/50% n-Heptane/20% 1,3-Dioxolane,
    20% α-Pinene/60% n-Heptane/20% 1,3-Dioxolane,
    30% α-Pinene/40% n-Heptane/30% 1,3-Dioxolane,
    20% α-Pinene/50% n-Heptane/30% 1,3-Dioxolane,
    30% d-Limonene/35% n-Heptane/35% 1,3-Dioxolane,
    20% d-Limonene/40% n-Heptane/40% 1,3-Dioxolane, and
    20% p-Cymene/40% n-Heptane/40% 1,3-Dioxolane.

2. The solvent blend of claim 1, wherein said at least one compound is 1,3-dioxolane.

3. The solvent blend of claim 1, wherein said at least one compound is 1,4-dioxane.

4. The solvent blend of claim 1, wherein said at least one compound is tetrahydrofuran.

5. The solvent blend of claim 1, wherein said at least one compound is methyl ethyl ketone.

6. The solvent blend of claim 1, wherein said at least one compound is cyclohexanone.

7. The solvent blend of claim 1, wherein said at least one compound is ethyl acetate.

8. The solvent blend of claim 1, wherein the multilayer oriented shrink film, which the solvent blend is useable for tackifying, is a plastic film including a cyclic olefin copolymer therein.

9. A shrink label comprising a multilayer, extruded film having an outer film layer, said label being configured to be wrapped about a peripheral surface of an article with one end overlapping and sealed to the outer film layer at an opposed end of said label, said seal being provided by applying to the outer film layer at said opposed end, prior to sealing, the solvent blend of claim 1 to tackify said outer film layer at said opposed end, whereby, upon tackifying the outer film layer at said opposed end said one end of said film is overlapped with said outer film layer and pressed into sealing engagement therewith.

10. The shrink label of claim 9, wherein said outer film layer includes a cyclic olefin copolymer therein.

11. A method for providing a shrink label on an article, said method comprising the following steps:
    providing a shrink label comprising a multilayer, extruded film having an outer film layer comprising at least one cyclic-olefin copolymer;
    wrapping the shrink label about a peripheral surface of an article such that one end of the shrink label overlaps the outer film layer at an opposed end of the shrink label;
    applying the solvent blend of claim 1 to the outer film layer at the opposed end of the shrink label to provide a tackified surface; and
    pressing together the one end and the tackified surface to seal the shrink label about the peripheral surface of the article.

* * * * *